United States Patent
Okuno et al.

(10) Patent No.: US 7,823,426 B2
(45) Date of Patent: Nov. 2, 2010

(54) ASSEMBLING METHOD OF ELECTRIC STEERING LOCK DEVICE

(75) Inventors: Masanari Okuno, Aichi (JP); Hiroyasu Hasegawa, Aichi (JP); Nobuhisa Inoue, Okazaki (JP)

(73) Assignee: Tokai Rika Co., Ltd., Aichi (JP)

( * ) Notice: Subject to any disclaimer, the term of this patent is extended or adjusted under 35 U.S.C. 154(b) by 236 days.

(21) Appl. No.: 12/022,564

(22) Filed: Jan. 30, 2008

(65) Prior Publication Data
US 2008/0178643 A1 Jul. 31, 2008

(30) Foreign Application Priority Data
Jan. 30, 2007 (JP) ............... 2007-019749

(51) Int. Cl.
*B60R 25/02* (2006.01)

(52) U.S. Cl. ............... 70/186; 70/282; 74/89.36; 384/202

(58) Field of Classification Search ........... 70/182–186, 70/252, 280–282; 74/89.23, 89.36; 292/142, 292/144; 384/202, 215, 243
See application file for complete search history.

(56) References Cited

U.S. PATENT DOCUMENTS

| | | | | |
|---|---|---|---|---|
| 2,468,333 | A * | 4/1949 | Johnson | 74/89.36 |
| 3,767,240 | A * | 10/1973 | Belanger | 292/144 |
| 4,274,294 | A * | 6/1981 | Siryj et al. | 74/424.95 |
| 5,438,888 | A * | 8/1995 | Dickhoff | 74/89.36 |
| 6,655,225 | B1 * | 12/2003 | Nagai et al. | 74/89.33 |
| 6,662,672 | B2 * | 12/2003 | Someya | 74/89.23 |
| 6,776,061 | B2 * | 8/2004 | Schuettel et al. | 74/89.36 |
| 7,021,093 | B2 | 4/2006 | Fukatsu et al. | |
| 7,260,963 | B2 * | 8/2007 | Suzuki et al. | 70/186 |
| 7,703,309 | B2 * | 4/2010 | Okuno et al. | 70/186 |
| 2004/0007030 | A1 * | 1/2004 | Zillmann | 70/186 |

(Continued)

FOREIGN PATENT DOCUMENTS

| | | |
|---|---|---|
| JP | 2004-231123 | 8/2004 |
| JP | 2006-36107 | 2/2006 |

OTHER PUBLICATIONS

Chinese Official Action dated Jun. 26, 2009 together with English language translation.

*Primary Examiner*—Lloyd A Gall
(74) *Attorney, Agent, or Firm*—Scully, Scott, Murphy & Presser, P.C.

(57) ABSTRACT

A built-in step is conducted by building a drive part which generates a rotation drive power, a rotation shaft to be rotated by the rotation drive power of the drive part through a gear mechanism, a lock stopper to be screwed with the rotation shaft to move axially by rotating of the rotation shaft, a lock bar which moves between a lock position for locking a steering shaft by movement of the lock stopper and an unlock position for unlocking the steering shaft, and a first spring interposed between the lock stopper and the lock bar for giving a bias load, into a lock body to be installed in a mounting hole part of a steering column post of a vehicle from the same direction. Thereafter, a screwing step for screwing the rotation shaft and the lock stopper after the built-in step is conducted to assemble an electric steering lock device.

6 Claims, 5 Drawing Sheets

U.S. PATENT DOCUMENTS

2004/0182121 A1    9/2004  Fukatsu et al.
2006/0021398 A1*  2/2006  Hasegawa et al. ............. 70/186
2006/0196237 A1*  9/2006  Hibino et al. ................. 70/186
2008/0047309 A1*  2/2008  Okuno et al. ................. 70/252

* cited by examiner

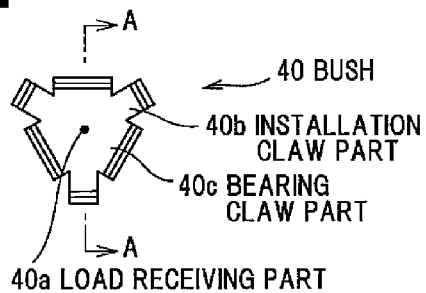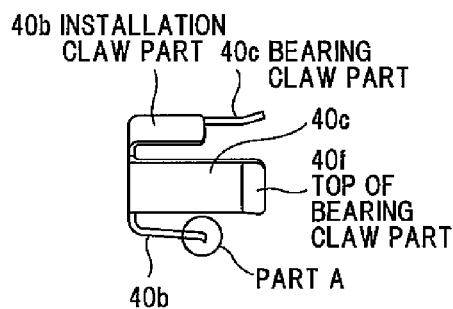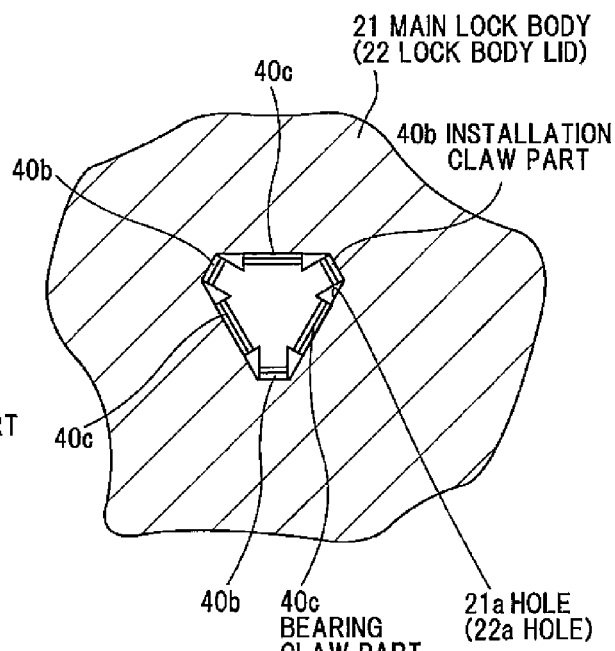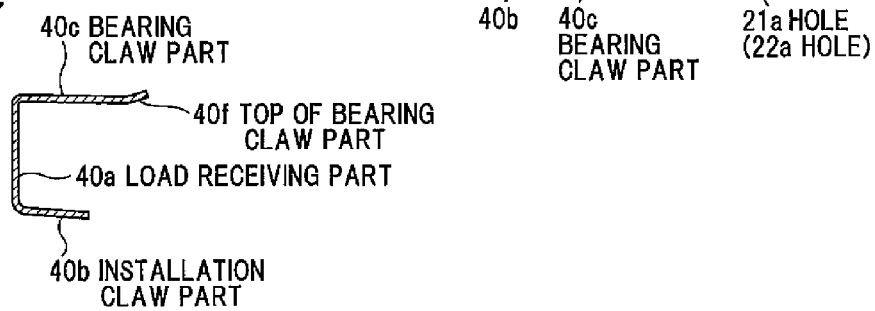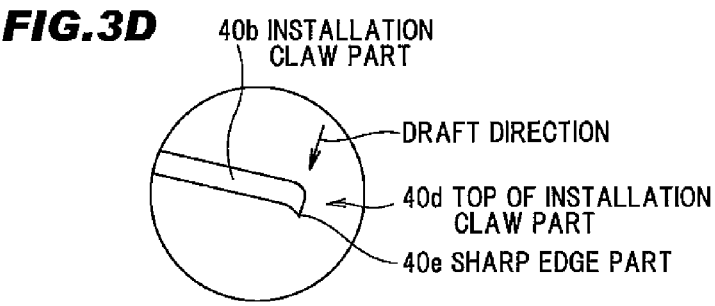

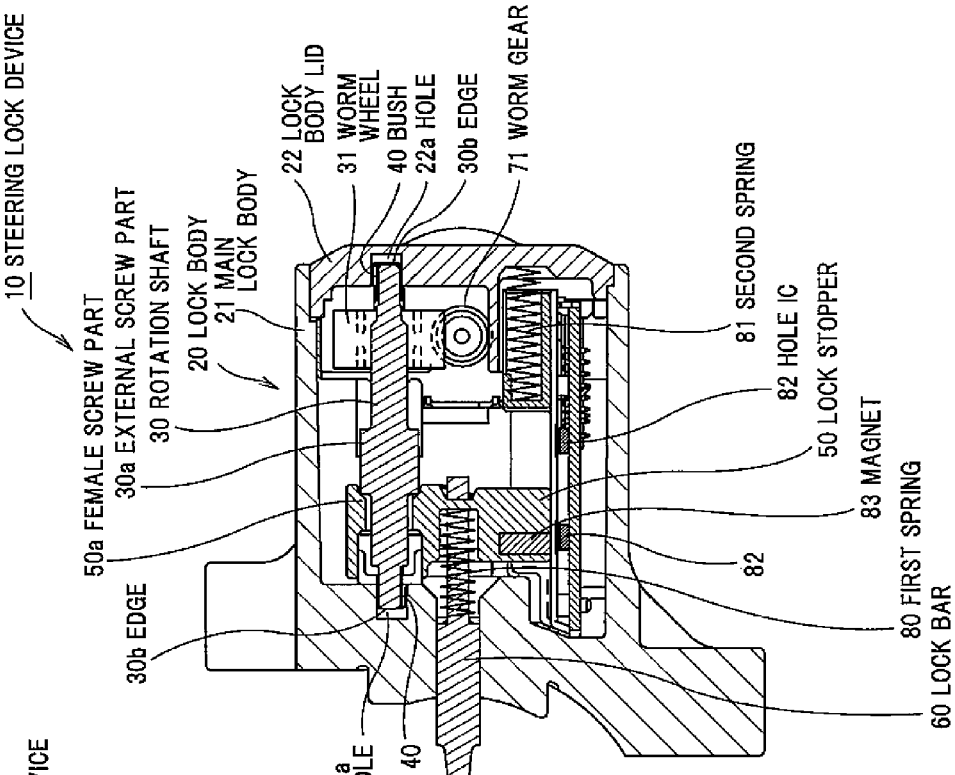
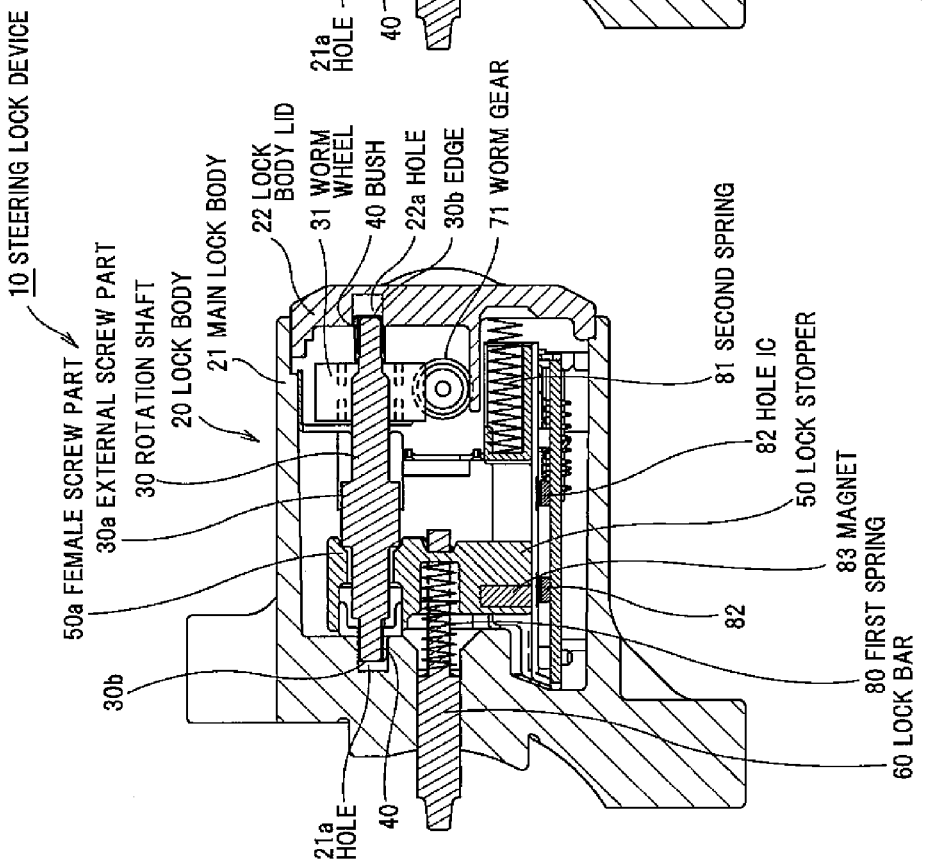

ASSEMBLING METHOD OF ELECTRIC STEERING LOCK DEVICE

The present application is based on Japanese Patent Application No. 2007-019749 filed on Jan. 30, 2007, the entire contents of which are incorporated herein by reference.

BACKGROUND OF THE INVENTION

1. Field of the Invention

The present invention relates to an assembling method of an electric steering lock device, to be applied to vehicles such as automobiles.

2. Related Art

As conventional electric steering lock devices, for example, JP-A-2004-231123 and JP-A-2006-36107 disclose, respectively, an electric steering lock device comprising a worm gear which rotates by a rotary motor, a helical gear which rotates by rotation of the worm gear, a lock arm and a cam which operate in association with rotation of this helical gear, a lock stopper which moves between a lock position and an unlock position with respect to a steering shaft, a lock bar, and a lock body housing these parts has been known.

This electric steering lock device has a configuration, in which the lock bar is moved between the lock position and the unlock position with respect to the steering shaft by mutually rotating the rotary motor in opposite directions.

However, according to the electric steering lock device of JP-A-2004-231123 etc., when assembling the electric steering lock device, it was necessary to build, for example, the lock bar, the helical gear and the lock stopper etc. into the lock body from different directions. Accordingly, it was impossible to assemble these parts from the same direction. Therefore, there is a disadvantage in that it was difficult to realize the automatic assembling of the electric steering lock device, and there was a limit to reduce the cost of manufacturing by shortening the assembling time.

THE SUMMARY OF THE INVENTION

It is an object of the invention to provide an assembling method of an electric steering lock device, in which various components can be built into the lock body from the same direction when assembling the electric steering lock device, thereby realizing the automatic assembling.

[1] According to one aspect of the invention, an assembling method of an electric steering lock device comprises:

a built-in step of building a drive part which generates a rotation drive power, a rotation shaft to be rotated by the rotation drive power of the drive part through a gear mechanism, a lock stopper to be screwed with the rotation shaft to move axially by rotating of the rotation shaft, a lock bar which moves between a lock position for locking a steering shaft by movement of the lock stopper and an unlock position for unlocking the steering shaft, and a first spring interposed between the lock stopper and the lock bar for giving a bias load, into a lock body to be installed in a mounting hole part of a steering column post of a vehicle from the same direction; and a screwing step for screwing the rotation shaft and the lock stopper after the built-in step.

[2] In the assembling method of an electric steering lock device described in above-mentioned [1], the built-in step may comprise a step of previously building the lock bar, the first spring, and the lock stopper into the lock body from the same direction in a temporary assembled state as a sub-assay.

[3] In the assembling method of an electric steering lock device described in above-mentioned [1], the screwing step may comprises a step of applying a load on the lock stopper in a direction to screw with the rotation shaft through the first spring by applying a load on the lock bar from outside, and rotating the rotation shaft, to screw the lock bar with the rotation shaft.

[4] The assembling method of the electric steering lock device described in above-mentioned [1] may further comprise a bush insertion step of press fitting a bush to each of holes of the lock body and a lock body lid until a middle of each of the holes in a temporally assembled state, prior to the built-in step.

[5] In the assembling method of the electric steering lock device described in above-mentioned [1], it is preferable that a male screw part of the rotation shaft and a female screw part of the lock stopper are not screwed with each other yet as a spinning state, prior to the screwing step.

[6] In the assembling method of the electric steering lock device described in above-mentioned [4], the built-in step may be conducted in a state that no clearance is provided between an edge of the rotation shaft and a load receiving part of the bush.

[7] In the assembling method of the electric steering lock device described in above-mentioned [1], the built-in step and the screwing step may be conducted by an automatic assembling.

EFFECT OF THE INVENTION

According to embodiments of the present invention, it is possible to provide the assembling method of the electric steering lock device, in which various components can be built into the lock body from the same direction when assembling the electric steering lock device, thereby realizing the automatic assembling.

BRIEF DESCRIPTION OF THE DRAWINGS

Next, the present invention will be explained in more detail in conjunction with appended drawings, wherein:

FIGS. 3A to 3E are diagrams of a bush 40, wherein FIG. 3A is a plan view thereof, FIG. 3B is a side view thereof, FIG. 3C is a cross sectional view thereof along A-A line in FIG. 3A, FIG. 3D) is an enlarged view of a part A in FIG. 3B, and FIG. 3E is a plan view showing a state in which the bush 40 is press fitted into holes 21a, 22a of a main lock body 21 or a lock body lid 22;

FIGS. 4A and 4B are cross sectional views of the electric steering lock device 10 in the preferred embodiment according to the present invention, wherein FIG. 4A shows a state in which each components are built in from the same direction and the lock body lid 22 is not connected or fixed to the main lock body 21, and FIG. 4B shows a state in which the main lock body 21 and the lock body lid 22 are pushed from both sides to have a predetermined positional relation and assembled by fixing with springs etc. in the state in which each components are built in as shown in FIG. 4A.

DESCRIPTION OF THE PREFERRED EMBODIMENTS

Embodiment of this Invention

Figure 1:
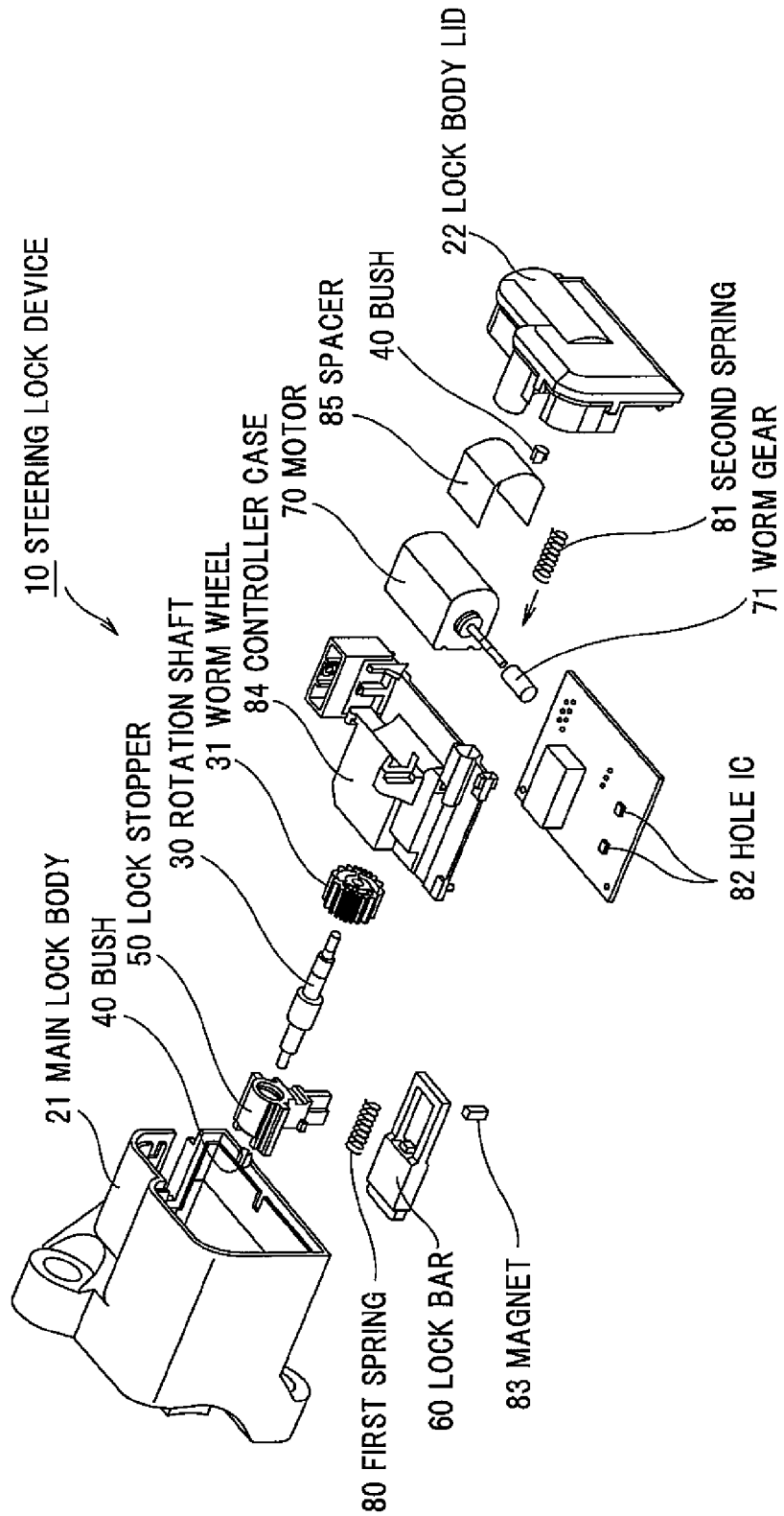
FIG. 1 is an exploded perspective view showing an assembly relation of each components of an electric steering lock device 10 to be installed in a steering column post 1 of a vehicle such as an automobile in a preferred embodiment according to the present invention.

FIG. 1 is an exploded perspective view showing an assembly relation of each components of an electric steering lock device 10 to be installed in a steering column post 1 of a vehicle such as an automobile in a preferred embodiment according to the present invention.

Figure 2:
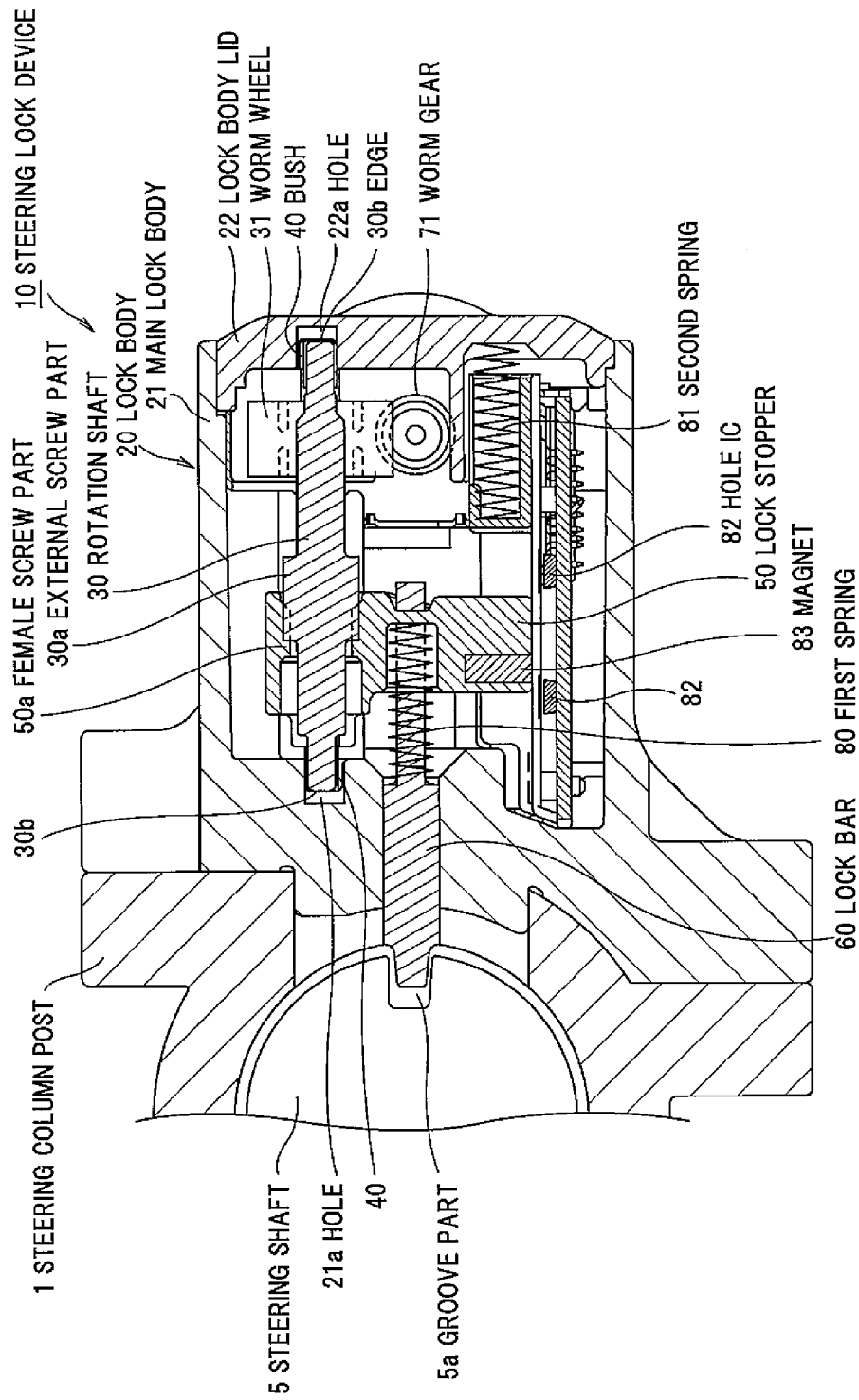
FIG. 2 is a cross section of the steering lock device 10 installed in the steering column post 1, which shows a cross section including a centerline of a rotation shaft 30 etc. in which the steering lock device 10 is assembled as shown in FIG. 1.

FIG. 2 is a cross section of the steering lock device 10 installed in the steering column post 1, which shows a cross section including a centerline of a rotation shaft 30 etc. in which the steering lock device 10 is assembled as shown in FIG. 1.

The steering lock device 10 comprises a lock body 20, a rotation shaft 30, a worm wheel 31, a bush 40, a lock stopper 50, a lock bar 60, a motor 70 and a worm gear 71 etc.

The lock body 20 comprises a main lock body 21 and a lock body lid 22. The main lock body 21 and the lock body lid 22 comprise a predetermined material, for instance, magnesium die-cast or aluminum die-cast. The main lock body 21 is installed in a predetermined position of the steering column post 1. In the state that this main lock body 21 is installed in the steering column post 1, a lock bar 60 (to be described later) projected from a substantial central part of the main lock body 21 moves between a lock position for locking a rotation of a steering shaft 5 and an unlock position for unlocking the steering shaft 5, to switch a connecting state and a non-connecting state with a groove part 5a of the steering shaft 5.

Holes 21a and 22a to which the bush 40 (to be described later) is fitted respectively by press fitting are formed on the main lock body 21 and the lock body lid 22. These holes 21a and 22a are formed deeply enough so that a load receiving part 40a of the bush 40 does not reach to a bottom of the holes 21a and 22a at the time of completion of assembly.

In the rotation shaft 30, an external screw part 30a, which is screwed with a female screw part 50a formed on the lock stopper 50 (to be described later), is formed in an intermediate part, and the worm wheel 31 on which a gear is formed is installed. An edge 30b is supported to be slidably rotatable by each of the main lock body 21 and the lock body lid 22 at both sides through the bush 40.

FIGS. 3A to 3E are diagrams of the bush 40, wherein FIG. 3A is a plan view thereof, FIG. 3B is a side view thereof, FIG. 3C is a cross sectional view thereof along A-A line in FIG. 3A, FIG. 3D is an enlarged view of a part A in FIG. 3B, and FIG. 3E is a plan view showing a state in which the bush 40 is press fitted into holes 21a, 22a of a main lock body 21 or a lock body lid 22.

The bush 40 comprises a material having a spring property such as stainless steel, and is installed by fitting the main lock body 21 and the lock body lid 22 into the holes 21a and 22a with a predetermined fit. The bush 40 is provided with the load receiving part 40a, an installation claw part 40b, and a bearing claw part 40c. The load receiving part 40a functions as a contact face with the edge 30b of the rotation shaft 30, and three installation claw parts 40b and three bearing claw parts 40c are respectively provided to protrude alternately in a substantially vertical direction from this contact face side.

The installation claw part 40b is configured to be opened from the load receiving part 40a to a top of an installation claw part 40d, so that the installation claw part 40b can be fixed to the holes 21a and 22a formed on the main lock body 21 or the lock body lid 22 by press fitting. For instance, each of the top of installation claw parts 40d is inclined to be 0.2 mm outward from an end of the load receiving part 40a which connects to the installation claw part 40b. Furthermore, as shown in FIG. 3D, the installation claw part 40b is such configured that a surface press fitted to the holes 21a and 22a functions as a burr side by adjusting a draft direction to a direction indicated by an arrow at the time of press work, and a sharp edge part 40e is embedded into the holes 21a and 22a, not to be dropped off easily.

The bearing claw part 40c is configured to be narrowed from the load receiving part 40a to a top of a bearing claw part 40f; in order to support the rotation shall 30 to be slidably rotatable. The bearing claw part 40c supports an outer circumference of the rotation shaft 30 by three claws. For instance, each of the top of bearing claw parts 40f is inclined to be 0.1 mm inward from an end of the load receiving part 40a which connects to the bearing claw part 40c. For facilitating an assembly work with the rotation shaft 30, each of the end of the top of bearing claw parts 40f is inclined to be 0.2 mm outward from the base of the top of bearing claw parts 40f.

In the rotation shaft 30, the outer circumference of the rotation shaft 30 is supported to be slidably rotatable by the three bearing claw parts 40c without any clearance, and the edge 30b contacts to the load receiving part 40a of the bush 40 to be slidably rotatable without any clearance by the main lock body 21 and the lock body lid 22 through the bush 40 respectively. As a result, the rotation shaft 30 is supported to be slidably rotatable without any clearance in both radial and thrust directions.

The lock stopper 50 is screwed with an external screw part 30a of the rotation shaft 30 at the female screw part 50a, and is movable in an axial direction of the rotation shaft 30 by the rotation of the rotation shaft 30. The lock stopper 50 is connected to the lock bar 60 (to be described later) through the first spring 80. Furthermore, a controller case 84 is provided with a second spring 81, so as to give a bias load to the lock stopper 50 in a direction opposite to the bias load given by the first spring 80, so that the external screw part 30a of the rotation shaft 30 can be screwed with the female screw part 50a of the lock stopper 50, even if the lock stopper 50 moves too much in the non-connecting direction (the unlock direction) between the lock bar 60 and the steering shaft 5. A magnet 83 is installed under the lock stopper 50 to detect the position of the lock stopper 50 by a hole IC 82.

The lock bar 60 is connected with the lock stopper 50 through the first spring 80 and is movable between the lock position and the unlock position, so as to switch the connecting or non-connecting state with the groove part 5a of the steering shaft 5 by the rotation of the rotation shaft 30.

The motor 70 as a driving actuator is installed in the main lock body 21 through the controller case 84 and a spacer 85, and the worm gear 71 is installed around an axis of the motor 70. The worm gear 71 is screwed with a worm wheel 31 installed around the rotation shaft 30. As a result, the rotation of the motor 70 is transmitted to the rotation shaft 30 through the worm gear 71 and the worm wheel 31.

(Assembling Method of the Electric Steering Lock Device in the Preferred Embodiment of the Present Invention)

The bush 40, the lock bar 60, the first spring 80, the lock stopper 50, the rotation shaft 30, the controller case 84, the second spring 81, the motor 70, the spacer 85, the bush 40, and the lock body lid 22 are built into the main lock body 21 from the same direction (from a right side in FIG. 1).

Here, the worm wheel 31 is previously installed around the rotation shaft 30. Furthermore, it is preferable 'to provide a bush insertion process, in which the bush 40 is press fitted into the main lock body 21 and the holes 21a, 22a of the lock body lid 22 until a halfway of the installation claw part 40b, as a temporary assembled state. Furthermore, it is preferable to previously prepare a temporary assembly of the lock bar 60, the first spring 80 and the lock stopper 50, as a sub-assembly.

FIGS. 4A and 4B are cross sectional views of the electric steering lock device 10 in the preferred embodiment according to the present invention.

FIG. 4A shows a state in which each components are built in from the same direction and the lock body lid 22 is not connected or fixed to the main lock body 21, and FIG. 4B shows a state in which the main lock body 21 and the lock body lid 22 are pushed from both sides to have a predetermined positional relation and assembled by fixing with springs etc. in the state in which each components are built in as shown in FIG. 4A.

According to this step, the edge 30b of the rotation shaft 30 is press fitted to the holes 21a, 22a while pushing the load receiving part 40a, and assembled without any clearance (thrust) between the edge 30b of the rotation shaft 30 and the load receiving part 40a of the bush 40 (the rotation shaft built-in step). Even after this rotation shaft built-in step, the load receiving part 40a of the bush 40 does not reach to the bottom of the holes 21a and 22a.

In the above-mentioned step (FIG. 4B), the external screw part 30a of the rotation shaft 30 and the female screw part 50a of the lock stopper 50 are not screwed with each other yet, i.e. in a spinning state. Here, by applying a load on a front edge of the lock bar 60 from the outside, a load is applied to the lock stopper 50 in a direction to screw with the rotation shaft 30 through the first spring 80. By rotating the motor 70 so as to move the lock bar 60 in the direction to be the non-connecting state with the groove part 5a of the steering shaft 5 under this condition, the external screw part 30a of the rotation shaft 30 and the female screw part 50a of the lock stopper 50 are screwed with each other to be an assembled state as shown in FIG. 2 (the screw step).

According to the respective steps mentioned above, the assembling of the electric steering lock device 10 is completed, and it is possible to install the electric steering lock device 10 to the steering column post 1 in this state.

(Function of the Electric Steering Lock Device in the Preferred Embodiment of the Present Invention)

In the state that the lock bar 60 is connected with the groove part 5a of the steering shaft 5 (FIG. 2), when operating a switch of the vehicle to a position such as "ACC", "ON" and "START", the motor 70 rotates in a predetermined rotational direction, the lock bar 60 is activated through the worm wheel 31, the rotation shaft 30 and the lock stopper 50, and the connection of the lock bar 60 and the steering shaft 5 are unlocked, to provide the non-connecting state. In a process of this operation, the motor 70 rotates at high speed (for instance, 9600 rpm). As a result, the rotation shaft 30 receives a strong force between the edge 30b and the load receiving part 40a of the bush 40 as a reaction. However, the edge 30h and the load receiving part 40a contact with each other in a state of being slidably rotatable without clearance and without backlash, abnormal noise such as impact sound etc. is not generated in the operation as mentioned above. Furthermore, it is similar in the radial direction. Furthermore, since the bush 40 comprises, for instance, the stainless steel, problems of scraping or abrasion by the rotation of the rotation shaft 30 do not occur in a long-term use.

Figure 5:
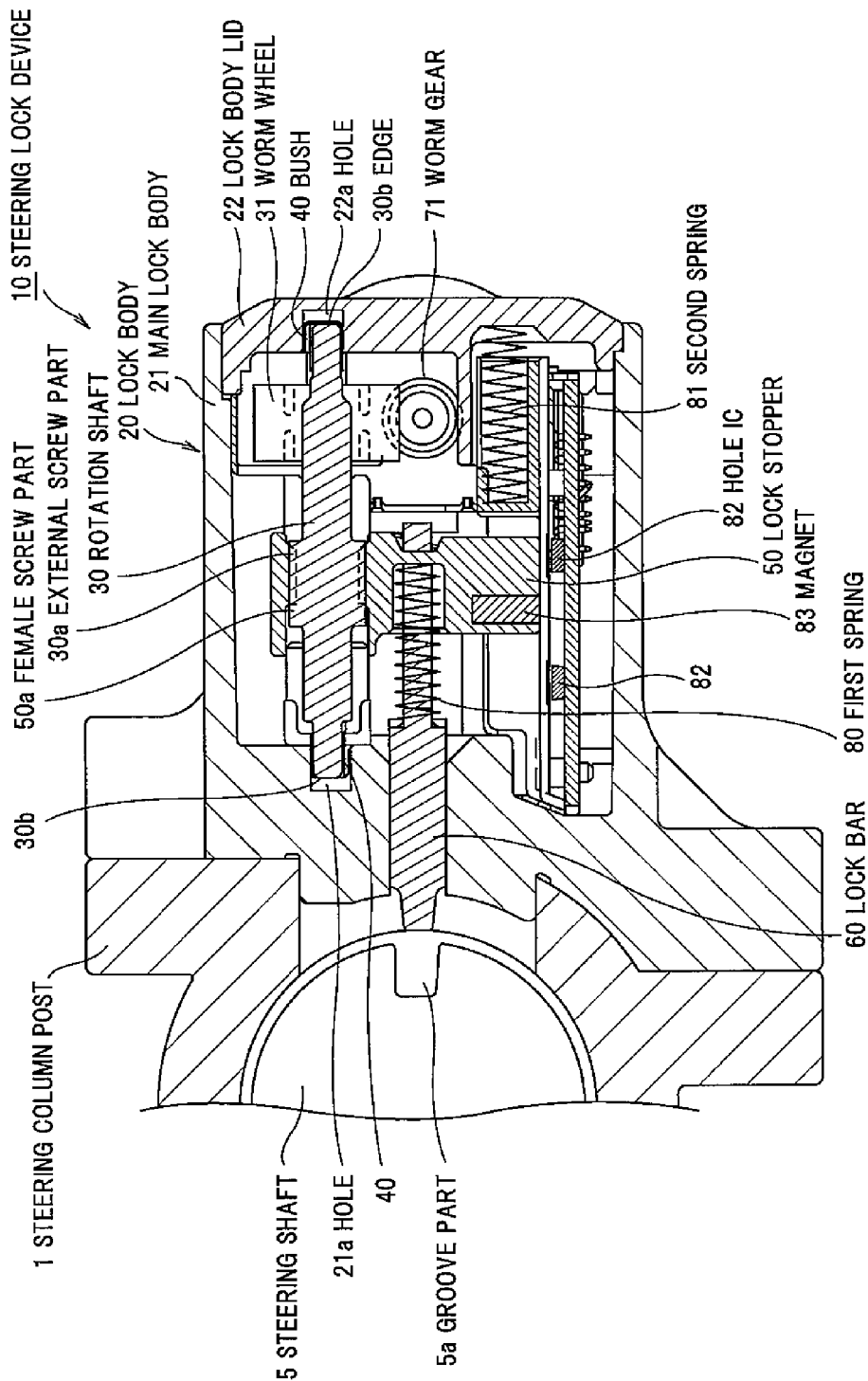
FIG. 5 is a cross sectional view of the electric steering lock device 10 in the preferred embodiment according to the present invention showing a non-connecting state, in which a lock bar 60 is not connected with a groove part 5a of a steering shaft 5.

FIG. 5 is a cross sectional view of the electric steering lock device 10 in the preferred embodiment according to the present invention showing a non-connecting state, in which a lock bar 60 is not connected with a groove part 5a of a steering shaft 5.

In the state that the lock bar 60 is not connected with the groove part 5a of the steering shaft 5, when operating the switch of the vehicle to a position of "LOCK", the motor 70 rotates in a rotational direction opposite to the rotational direction in the operation as mentioned above, the lock bar 60 is activated through the worm wheel 31, the rotation shaft 30, the lock stopper 50 and the first spring 80, and the lock bar 60 and the groove part 5a of the steering shaft 5 are unlocked, to provide the connecting state. In this case, similarly to the above, the rotation shaft 30 receives the strong force between the edge 30b and the load receiving part 40a of the bush 40 as a reaction. However, the edge 30b and the load receiving part 40a contact with each other in the state of being slidably rotatable without clearance and without backlash, the abnormal noise such as the impact sound etc. is not generated in the operation as mentioned above. When the position of the groove part 5a does not coincide with the position of the lock bar 60, the connecting state is realized by connecting the lock bar 60 and the groove part 5a of the steering shaft 5 with the bias load of the first spring 80 at the stage that the position of the groove part 5a coincides with the position of the position of the lock bar 60 by the rotation of the steering shaft 5.

(Effect of the Preferred Embodiment According to the Present Invention)

Since the moving direction of the lock bar 60, the axial direction of the rotation shaft 30, the moving direction by screwing with the external screw part 30a of the rotation shaft 30 and the female screw part 50a of the lock stopper 50, the bias direction of the first spring 80 and the second spring 81, and the press fitting direction of the bush 40 to the holes 21a, 22a are determined to be the same direction, these components can be built into the lock body 20 (the main lock body 21 and the lock body lid 22) from the same direction. As a result, the automatic assembling of the electric steering lock device 10 can be facilitated.

In the state that the rotation shaft 30 and the lock stopper 50 are built into the main lock body 21 from the same direction, the external screw part 30a of the rotation shaft 30 and the female screw part 50a of the lock stopper 50 are not screwed with each other yet, i.e. at the spinning state. However, in the state of applying the load on the front edge of the lock bar 60 and applying the load on the lock stopper 50 in the direction to screw with the rotation shaft 30 through the first spring 80, by rotating the motor 70, so as to move the lock bar 60 in the direction to be the non-connecting state with the groove part 5a of the steering shaft 5, the external screw part 30a of the rotation shaft 30 and the female screw part 50a of the lock stopper 50 can be screwed with each other. Namely, when building the components into the main lock body 21, it is enough to build the rotation shaft 30 and the lock stopper 50 into the main lock body 21 from the same direction, without rotating the rotation shaft 30. It is sufficient to provide the screw step of screwing the external screw part 30a of the rotation shaft 30 with the female screw part 50a of the lock stopper 50, after building all necessary components into the lock body 20. As a result, it is possible to realize the automatic assembling of the electric steering lock device 10.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. An assembling method of an electric steering lock device, comprising:
   a building-in step, including:
   building a drive part which generates a rotation drive power;
   providing a rotation shaft for rotation by the rotation drive power of the drive part through a gear mechanism and the rotation shaft being coupled to the gear mechanism;
   providing a lock stopper to be screwed with the rotation shaft, the lock stopper moving axially by rotating the rotation shaft;
   positioning a lock bar to move between a lock position for locking a steering shaft by movement of the lock stopper, and an unlock position for unlocking the steering shaft, and a first spring interposed between the lock stopper and the lock bar for giving a bias load, the first spring positioned into a lock body from a same direction as installing the lock stopper and the lock bar, the lock body being installed in a mounting hole part of a steering column post of a vehicle
   a screwing step, including:
   screwing together the rotation shaft and the lock stopper after the building-in step; and
   a bush insertion step, including:
   press fitting a bush to each of a plurality of holes of the lock body and a lock body lid halfway to a bottom of each of the plurality of holes in a temporally assembled state, prior to the building-in step,
   wherein a male screw part of the rotation shaft and a female screw part of the lock stopper are not screwed together, resulting in a spinning state prior to the screwing step.

2. The assembling method of the electric steering lock device according to claim 1, further comprising, in the building-in step:
   building the lock bar, the first spring, and the lock stopper into the lock body all from the same direction, relative to the lock body, in a temporary assembled state as a sub-assembly.

3. The assembling method of the electric steering lock device according to claim 1, wherein the screwing step comprises a step of applying a load on the lock stopper in a direction to couple with the rotation shaft by applying a load on the lock bar, and rotating the rotation shaft, to screw the lock stopper with the rotation shaft.

4. The assembling method of the electric steering lock device according to claim 1, wherein the building-in step is conducted in a state that no clearance is provided between an edge of the rotation shaft and a load receiving part of the bushes.

5. The assembling method of the electric steering lock device according to claim 1, wherein the screwing step is conducted by an automatic assembling after the building-in step.

6. The assembling method of the electric steering lock device according to claim 1, wherein a load receiving part of the bushes does not reach a bottom of the holes of the lock body and the lock body lid after the building-in step.

* * * * *